US012595435B2

(12) United States Patent
Adriaenssens et al.

(10) Patent No.: US 12,595,435 B2
(45) Date of Patent: Apr. 7, 2026

(54) DETERGENT COMPOSITIONS

(71) Applicant: The Procter & Gamble Company, Cincinnati, OH (US)

(72) Inventors: Kris Adriaenssens, Boortmeerbeek (BE); Giulia Ottavia Bianchetti, Brussels (BE); Franciele Gomes De Oliveira Fiorio, Ghent (BE); Amanda Kiser Jukes, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 362 days.

(21) Appl. No.: 18/121,036

(22) Filed: Mar. 14, 2023

(65) Prior Publication Data

US 2023/0340363 A1 Oct. 26, 2023

(30) Foreign Application Priority Data

Mar. 15, 2022 (EP) .................................... 22162179
Oct. 21, 2022 (EP) .................................... 22202897

(51) Int. Cl.

| | |
|---|---|
| ***C11D 1/00*** | (2006.01) |
| ***C11D 1/14*** | (2006.01) |
| ***C11D 1/38*** | (2006.01) |
| ***C11D 3/50*** | (2006.01) |
| ***C11D 17/00*** | (2006.01) |

(52) U.S. Cl.

CPC .............. *C11D 1/143* (2013.01); *C11D 1/146* (2013.01); *C11D 1/38* (2013.01); *C11D 3/50* (2013.01); *C11D 17/0039* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 10,443,019 | B2 | 10/2019 | Fossum et al. | |
| 2010/0035792 | A1* | 2/2010 | Yamaguchi ........... | C08F 220/56 510/516 |
| 2016/0060573 | A1 | 3/2016 | Fossum et al. | |
| 2016/0281034 | A1 | 9/2016 | Panandiker | |
| 2020/0199495 | A1 | 6/2020 | Lambert et al. | |
| 2022/0049191 | A1 | 2/2022 | Fossum et al. | |

OTHER PUBLICATIONS

Extended European Search Report and Search Opinion; Application No. 22202897.9, dated Jul. 10, 2023, 09 pages.
PCT Search Report and Written Opinion for PCT/US2023/064274 dated Jun. 16, 2023; 13 pages.
Valery Normand et al. "Modelling perfume deposition on fabric during a washing cycle: theoretical approach", vol. 23, No. 1, Jan. 18, 2008, pp. 49-57.
Extended EP Search Report and Written Opinion for 22162179.0 dated Aug. 17, 2022, 08 pages.

* cited by examiner

*Primary Examiner* — Necholus Ogden, Jr.
(74) *Attorney, Agent, or Firm* — Abigail O. Idokogi; Carrie Schwartz

(57) ABSTRACT

The need for laundry detergent compositions that provide improved deposition of hydrophilic perfume ingredients onto fabrics comprising cotton fibres, and especially those perfume ingredients that deposit less readily onto cotton fibres, is met by incorporating certain cationic polymers and specific perfume ingredients into a laundry detergent composition.

14 Claims, No Drawings

DETERGENT COMPOSITIONS

FIELD OF THE INVENTION

Laundry detergent compositions, especially liquid laundry detergent compositions or unit dose articles providing improved freshness for fabrics comprising cotton fibres.

BACKGROUND OF THE INVENTION

Perfumes have typically been added to laundry detergent compositions to help counteract malodour and also to make clothing smell "fresh". Perfumes are generally complex mixtures of a broad variety of natural or synthetic perfume ingredient molecules with a multitude of chemical functional groups such as alcohols, aldehydes, ketones, esters, lactones, ethers, and nitriles. Perfume ingredient molecules are often classified into three groups consisting of "top", "middle", and "bottom" notes, which represent different types of odours and, as the name already indicates, correlate to different volatilities of the corresponding class of compounds. Although this classification is neither rigorous nor systematic, top notes are usually the most volatile compounds which rapidly evaporate to give a fresh, floral, fruity, or green odour to a perfume, followed by the less volatile middle notes with aromatic, herbal, or spicy tonalities, and the relatively substantive, high-molecular weight bottom notes comprising woody, amber, or musky odorants.

Laundry detergent compositions are designed to remove soil and stains from fabrics. Perfume ingredients must withstand the cleaning chemistry and wash process, but still deposit onto fabrics at levels that are detectable on the fabric and provide the desired odour profile. However, hydrophilic perfume ingredients typically do not readily deposit onto cotton-comprising fabrics as they remain more suspended in the wash solution. This has meant that much more of such hydrophilic perfume ingredients have to be added to the liquid laundry composition in order to provide the desired odour profile to the laundered fabric. It is also desirable that the perfume ingredients have greater residuality on fabrics, so that they are longer lasting and also accumulate on the fabrics over multiple wash cycles. This results in improved freshness over multiple washes.

Hence, a need remains for laundry detergent compositions that provide improved deposition of hydrophilic perfume ingredients onto fabrics, especially fabrics comprising cotton fibres, and to provide greater residuality of the perfume ingredients over multiple washes.

WO2004016234A1 relates to a composition such as a water-based consumer product comprises material (e.g. perfume) encapsulated within shell capsules, each capsule comprising an encapsulating wall having an inner surface and an outer surface, with a coating on the inner surface and/or outer surface of the shell wall, the composition further comprising surfactant and/or solvent, the coating can improve the barrier properties of the shell and can enhance retention of the encapsulated materials within the shell. WO2015192972A1 and WO2015192973A1 relate to methods for conditioning a fabric comprising the step of contacting the fabric with an aqueous medium comprising a composition, wherein the composition comprises: (a) a quaternary ammonium compound; (b) a cationic polysaccharide; and (c) a nonionic polysaccharide, the quaternary ammonium compound is a biodegradable quaternary ammonium compound, the composition has excellent softening performance and improved perfume longevity. GB2432852A relates to polymer particles comprising a perfume, a benefit agent, preferably a sugar polyester, a polymer and a cationic deposition aid, the particle may further comprise a shell thus giving a core/shell morphology. WO1997048374A2 relates to liquid personal cleansing compositions for providing enhanced perfume deposition on the skin and providing increased on-skin fragrance longevity. EP3643772A1 relates to a single dose scent-boosting pack comprising: a container comprising a water-soluble film; and a single dose scent-boosting composition encapsulated within said container, wherein said single dose scent-boosting composition comprises: 0.1 to 10 weight percent of a fragrance based on a total weight of said scent-boosting composition; 45 to 75 weight percent of a saccharide based on a total weight of said scent-boosting composition; 0.1 to 6 weight percent of a surfactant based on a total weight of said scent-boosting composition; and 10 to 25 weight percent of water based on a total weight of said scent-boosting composition. WO1998052527A1 relates to a perfume fixative comprising: (a) polyvinylpyrrolidone (PVP); (b) hydroxypropyl cellulose (HPC); and (c) hydrophobic oil, the perfume fixative is used by being incorporated in a perfume-containing formulation or product. EP3275983A relates to a laundry, laundry aftertreatment or laundry care composition, in particular a liquid detergent containing from 0.001 to 30% by weight, preferably from 0.01 to 4% by weight of at least one polymer comprising vinylpyrrolidone and/or vinyl acetate, and textiles provide improved crease resistance and increased softness after laundering, as well as the use of the polymers essential to the invention to minimize crease tendency, facilitate ironing and increase the softness of fabrics. WO2010025116A1 relates to stable colour maintenance and/or rejuvenation compositions comprising at least one cationic polymer and anionic surfactant, and methods for providing the same. WO2013070560A1 relates to surface treatment compositions comprising certain cationic polymer(s), anionic surfactant, one or more shielding salts and hydrophobic association disruptor, the surface treatment compositions comprises at least 6% by weight of cationic polymer, at least 6% by weight anionic surfactant, and at least 4% by weight of the shielding salt, the weight ratio of anionic surfactant to cationic polymer is between 0.5:1 and 4:1, the composition may also have a weight ratio of shielding salt to cationic polymer of between 0.3:1 and 3:1. EP3275983A is directed to a laundry, laundry aftertreatment or laundry care composition, in particular a liquid detergent containing from 0.001 to 30% by weight, preferably from 0.01 to 4% by weight of at least one polymer comprising vinylpyrrolidone and/or vinyl acetate, to provide improved crease resistance and increased softness after laundering. US2002/010105A relates to a detergent composition containing efficient enduring perfume composition, the detergent composition comprises: a perfume composition comprising at least about 70% of enduring perfume ingredients characterized by having boiling points, measured at the normal, standard pressure, of about 250° C. or higher, and a log P, or calculated log P, of about 3 or higher, the perfume is substantially free of halogenated fragrance materials and nitromusks, the composition also contains from about 0.01% to about 95% of a detergent surfactant system, preferably containing anionic and/or nonionic detergent surfactants. EP1072673A relates to a laundry and cleaning composition comprising a bleaching system and a selected perfume composition, wherein the perfume composition comprises perfume ingredients selected from the classes of unsaturated perfume ingredients of ester, ether, alcohol, aldehyde, ketone, nitrile, lactone, schiff-bases, terpenes and derivatives thereof, cyclic alkene, cyclic oxide, oxime, and mixtures thereof, also provided is the perfume composition, wherein the amount of unsaturated materials represents at least 40% by weight of the perfume composition. EP3375854A relates to liquid laundry detergent compositions comprising core/shell encapsulates, water-soluble unit dose articles comprising said encapsulates and methods of using said compositions and unit dose articles.

SUMMARY OF THE INVENTION

The present invention relates to a liquid laundry detergent composition comprising a surfactant system, cationic polymer and a non-encapsulated perfume, wherein the surfactant system comprises surfactant at a level of from 1.0 wt % to 70 wt % of the composition, wherein the surfactant system comprises anionic surfactant at a level of from 1.4% to 52% by weight of the liquid laundry detergent composition; wherein the cationic polymer is selected from: poly (diallyldimethylammonium chloride); copolymer of diallyldimethylammonium chloride and acrylic acid; copolymer of acrylamide and methacrylamidopropyltrimethyl ammonium chloride; copolymer of acrylamide and diallyldimethylammonium chloride; copolymer of methacrylate, methacrylamidopropyltrimethyl ammonium chloride and acrylic acid; copolymer of acrylamide, methacrylamidopropyltrimethyl ammonium chloride and acrylic acid; copolymer of acrylamide, diallyldimethylammonium chloride, and acrylic acid; copolymer of acrylamide and N,N, N-trimethyl aminoethyl acrylate; copolymer of diallyldimethylammonium chloride and vinyl alcohol, and mixtures thereof; and wherein the perfume comprises hydrophilic perfume ingredients having a Log P of less than 3.0, wherein the hydrophilic perfume ingredients are selected from the group consisting of: allyl amyl glycolate, anisic aldehyde, benzyl acetate, ethyl methyl phenyl glycidate, isoamyl butyrate, laevo carvone, methyl salicylate, para cresyl methyl ether, phenyl ethyl dimethyl carbinol, and mixtures thereof.

The present invention further relates to the use of a laundry detergent composition comprising such cationic polymers for improving the deposition of perfume raw materials onto cotton fabrics.

DETAILED DESCRIPTION OF THE INVENTION

The detergent compositions of the present invention have been found to provide improved deposition of perfume ingredients onto fabrics comprising cotton fibres, and especially those perfume ingredients that typically do not readily deposit onto cotton fibres and improve perfume ingredient residuality on cotton fibres over multiple washes.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

All measurements are performed at 25° C. unless otherwise specified.

As used herein, the articles including “a” and “an” when used in a claim, are understood to mean one or more of what is claimed or described.

Laundry Detergent Composition:

The laundry detergent composition is liquid in form.

As used herein, “liquid detergent composition” refers to a liquid detergent composition which is fluid, and preferably capable of wetting and cleaning a fabric, e.g., clothing in a domestic washing machine. As used herein, “laundry detergent composition” refers to compositions suitable for washing clothes. The composition can include solids or gases in suitably subdivided form, but the overall composition excludes product forms which are non-fluid overall, such as tablets or granules. The liquid laundry detergent composition preferably has a density in the range from 0.9 to 1.3 grams per cubic centimetre, more specifically from 1.00 to 1.10 grams per cubic centimetre, excluding any solid additives but including any bubbles, if present.

The composition can be an aqueous liquid laundry detergent composition. For such aqueous liquid laundry detergent compositions, the water content can be present at a level of from 5.0% to 95%, preferably from 25% to 90%, more preferably from 50% to 85% by weight of the liquid detergent composition.

The pH range of the detergent composition can be from 6.0 to 8.9, preferably from pH 7 to 8.8.

The detergent composition can also be encapsulated in a water-soluble film, to form a unit dose article. Such unit dose articles comprise a detergent composition of the present invention, wherein the detergent composition comprises less than 20%, preferably less than 15%, more preferably less than 10% by weight of water, and the detergent composition is enclosed in a water-soluble or dispersible film. Such unit-dose articles can be formed using any means known in the art. Suitable unit-dose articles can comprise one compartment, wherein the compartment comprises the liquid laundry detergent composition. Alternatively, the unit-dose articles can be multi-compartment unit-dose articles, wherein at least one compartment comprises the liquid laundry detergent composition.

The detergent composition can be a powder laundry detergent composition. Such powder laundry detergent compositions are solid free-flowing particulate laundry detergent compositions. Typically, the powder laundry detergent composition is a fully formulated laundry detergent composition, not a portion thereof such as a spray-dried, extruded or agglomerate particle that only forms part of the laundry detergent composition. Typically, the powder composition comprises a plurality of chemically different particles, such as spray-dried base detergent particles and/or agglomerated base detergent particles and/or extruded base detergent particles, in combination with one or more, typically two or more, or five or more, or even ten or more particles selected from: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as coloured noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, preferably these enzyme granulates comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

The detergent compositions of the present invention may comprise renewable components. The compositions disclosed herein may comprise from 20% or from 40% or from 50%, to 60% or 80% or even to 100% by weight of renewable components. The compositions disclosed herein may be at least partially or fully bio-based, As such, the composition can comprise a bio-based carbon content of from 50% to 100%, preferably from 75% to 100%, most preferably from 80% to 100%, most preferably 90% to 100%. By bio-based, it is meant that the material is derived from substances derived from living organisms such as farmed plants, rather than, for example, coal-derived or petroleum-derived. The percent bio-based carbon content can be calculated as the "percent Modern Carbon (pMC)" as derived using the methodology of ASTM D6866-16. The compositions of the present disclosure may be substantially free of petroleum-derived solvents. The compositions of the present disclosure may be substantially free of surfactants or even polymers derived from petroleum-derived alcohols.

The laundry detergent compositions can be made using any suitable process known to the skilled person.

Cationic Polymer:

The cationic polymer is selected from the group consisting of: poly (diallyldimethylammonium chloride) (polyquaternium 6); copolymer of diallyldimethylammonium chloride and acrylic acid (such as polyquaternium 22); copolymer of acrylamide and methacrylamidopropyltrimethyl ammonium chloride; copolymer of acrylamide and diallyldimethylammonium chloride (polyquaternium 7); copolymer of methacrylate, methacrylamidopropyltrimethyl ammonium chloride and acrylic acid (polyquaternium 47); copolymer of acrylamide, methacrylamidopropyltrimethyl ammonium chloride and acrylic acid (polyquaternium 53); copolymer of acrylamide, diallyldimethylammonium chloride, and acrylic acid (polyquaternium 39); copolymer of acrylamide and N,N, N-trimethyl aminoethyl acrylate; copolymer of diallyldimethylammonium chloride and vinyl alcohol; and mixtures thereof, preferably from the group consisting of: the cationic polymer is selected from: poly (diallyldimethylammonium chloride) (such as polyquaternium 6); copolymer of diallyldimethylammonium chloride and acrylic acid (such as polyquaternium 22); copolymer of methacrylate, methacrylamidopropyltrimethyl ammonium chloride and acrylic acid (such as polyquaternium 47); and mixtures thereof, more preferably the cationic polymer is copolymer of diallyldimethylammonium chloride and acrylic acid (such as polyquaternium 22).

For copolymer of diallyldimethylammonium chloride and acrylic acid the preferred ratio of diallyldimethylammonium chloride to acrylic acid is between approximately 90:10 and 50:50. The preferred cationic polymer is diallyldimethylammonium chloride acrylic acid copolymer at a 65/35 mole ratio with a molecular weight of approximately 450,000. Copolymers of diallyldimethylammonium chloride and acrylic acid may be further described by the nomenclature Polyquaternium-22 or PQ22 as named under the International Nomenclature for Cosmetic Ingredients. Copolymers of acrylamide and diallyldimethylammonium chloride may be further described by the nomenclature Polyquaternium-7 or PQ7 as named under the International Nomenclature for Cosmetic Ingredients.

Table 1 below includes cationic charge densities and monomer molecular weights for selected cationic polymers.

| Polymer | Chemical description | Monomer mw | Cationic charges per repeat unit | Charge density (meq/g) |
|---|---|---|---|---|
| Polyquaternium 22, neutralized | copolymer of diallyldimethyl-ammonium chloride and acrylic acid 65/35 mole ratio, neutralized with NaOH | 161.67 (DADMAC) 94.05 (acrylic acid, sodium neutralized) | 30 | 2.17 |
| Polyquaternium 22, un-neutralized | copolymer of diallyldimethyl-ammonium chloride and acrylic acid 65/35 mole ratio | 161.67 (DADMAC) 72.06 (acrylic acid) | 65 | 4.99 |

The cationic polymer can be present at a level of from 0.1% to 10%, preferably 0.5% to 5.0%, more preferably from 1.0% to 2.5% by weight of the composition.

The cationic polymer has a molecular weight of from 1,000 Da to 1,250,000 Da, preferably from 100,000 Da to 1,000,000 Da, more preferably from 250,000 Da to 750,000 Da.

The cationic polymer can have a charge density in the range of 0.05 to 25 meq/g when calculated at pH 7. Without being bound by theory, the molecular weight, charge density, and presence of hydrophobic modifications within the polymer structure of the cationic polymer may affect the ability of the shielding salt to effectively prevent the polymer-surfactant complex from forming.

Moreover, the charge density may be in the range of 0.05 to 25 meq/g when calculated at pH 7, or preferably below 7.0 meq/g, more preferably below 5.0 meq/g, and even more preferably below 3.0 meq/g when calculated at pH 7. As used herein, "charge density" refers to the charge density of the final polymer and may be different from the monomer feedstock. Charge density may be calculated by dividing the number of net charges per repeating unit by the molecular weight of the repeating unit and then multiplying by 1000. It should be noted that the positive charges may be located on the backbone of the cationic polymer and/or on the side chains of the cationic polymer. In the case of cationic polymers with amine monomers, the charge density depends on the pH of the carrier and thus the charge density for comparison with this disclosure should be measured at pH of 7.

Perfume

The composition comprises perfume. Preferably the perfume is present in the composition as a "free" perfume. That is, the perfume is non-encapsulated and hence is distributed throughout the laundry detergent composition. The composition can comprise such free perfume at a level of from 0.1% to 5.0%, preferably from 0.25% to 3.0%, more preferably from 0.5% to 1.5% by weight of the composition.

Perfumes comprise perfume ingredients or compounds. It has surprisingly been discovered that the cationic polymer of use in the present invention improve the deposition of hydrophilic perfume ingredients, especially when the hydrophilic perfume ingredients comprise: allyl amyl glycolate, anisic aldehyde, benzyl acetate, ethyl methyl phenyl glycidate, isoamyl butyrate, laevo carvone, methyl salicylate, para cresyl methyl ether, phenyl ethyl dimethyl carbinol, and mixtures thereof. The hydrophobic perfume ingredients preferably comprise allyl amyl glycolate, anisic aldehyde, benzyl acetate, isoamyl butyrate, methyl salicylate, para cresyl methyl ether, phenyl ethyl dimethyl carbinol, and mixtures thereof, preferably allyl amyl glycolate, benzyl acetate, anisic aldehyde, isoamyl butyrate, para cresyl methyl ether, and mixtures thereof.

The hydrophobic perfume ingredients described herein can be present at a level of from 0.05 to 50.0%, preferably from 0.10% to 25.0%, more preferably from 0.2% to 10.0% by weight of the free perfume. Allyl amyl glycolate is preferably present at a level of from 0.1% to 10%, preferably from 0.1% to 3.0%, more preferably from 0.1% to 1.5% by weight of the free perfume. Anisic aldehyde is preferably present at a level of from 0.1% to 10%, preferably from 0.1% to 5.0%, more preferably from 0.1% to 2.0% by weight of the free perfume. Benzyl acetate is preferably present at a level of from 0.1% to 25%, preferably from 0.1% to 10%, more preferably from 0.1% to 5.0% by weight of the free perfume. Ethyl methyl phenyl glycidate is preferably present at a level of from 0.1% to 10.0%, preferably from 0.1% to 5.0%, more preferably from 0.1% to 1.5% by weight of the free perfume. Isoamyl butyrate is preferably present at a level of from 0.01% to 8.0%, preferably from 0.01% to 1.0%, more preferably from 0.01% to 0.3% by weight of the free perfume. Laevo carvone is preferably present at a level of from 0.01% to 10%, preferably from 0.01% to 5.0%, more preferably from 0.01% to 1.0% by weight of the free perfume. Methyl salicylate is preferably present at a level of from 0.001% to 5%, preferably from 0.001% to 1.0%, more preferably from 0.001% to 0.3% by weight of the free perfume. Para cresyl methyl ether is preferably present at a level of from 0.01% to 8.0%, preferably from 0.01% to 1.0%, more preferably from 0.01% to 0.4% by weight of the free perfume. Phenyl ethyl dimethyl carbinol is preferably present at a level of from 0.1% to 10%, preferably from 0.1% to 5.0%, more preferably from 0.1% to 2.0% by weight of the free perfume.

The perfume comprises hydrophilic perfume ingredients having a Log P of less than 3.

A measure of the hydrophobicity of perfume ingredients is given by the log P (Octanol/Water), which is a physicochemical property. The octanol/water partition coefficient (P) of a perfume ingredient is the ratio between its equilibrium concentrations in octanol and in water. Since the partitioning coefficients of perfume ingredients are typically high, they are more conveniently given in the form of their logarithm to the base 10, log P.

The log P value of a compound is the logarithm of its partition coefficient between n-octanol and water and is a well-established measure of the compound's hydrophilicity/hydrophobicity. More hydrophilic perfume ingredients typically deposit less effectively from the wash liquor on to fabrics during the wash process (see "Modelling perfume deposition on fabric during a washing cycle: theoretical approach", Normand et el., January 2008, Flavour and Fragrance Journal 23 (1): 49-57).

The log P of a perfume ingredient is preferably calculated using the method described herein, often referred to as the consensus log P or c log P. Where not possible to calculate the c log P, the log P can be measured. The c log P and measured log P can typically differ by small amounts. In such cases, the c log P value is preferantially used.

The log P values can be calculated using the fragment approach of Hansch and Leo and given as c log P. See, for example, A. Leo, Comprehensive Medicinal Chemistry, Vol 4, C. Hansch et al. p 295, Pergamon press, 1990. For the present invention, the c log P is preferably calculated using the consensus Log P module of ACD/Labs (Advanced Chemistry Development, Inc, Canada) Percepta platform (version 2020), available online (acdlabs.com). The consensus Log P model predicts Log P as a weighted average of ACD/Log P Classic and ACD/Log P GALAS predictions.

In such models, the c log P of a compound is determined by the sum of its non-overlapping molecular fragments (defined as one or more atoms covalently bound to each other within the molecule). Fragmentary log P values have been determined in a statistical method analogous to the atomic methods (least-squares fitting to a training set). In addition, Hammett-type corrections are typically included to account of electronic and steric effects. While such methods generally gives better results than atomic-based methods, they cannot be used to predict partition coefficients for molecules containing unusual functional groups for which the method has not yet been parameterized (such as where there is a lack of experimental data for molecules containing such functional groups).

Alternatively, but less preferably, measurement of Log P can done in a variety of ways, the most common being the shake-flask method, which consists of dissolving some of the solute in question in a volume of octanol and water, shaking for a period of time, then measuring the concentration of the solute in each solvent. This can be time-consuming particularly if there is no quick spectroscopic method to measure the concentration of the molecule in the phases. A faster method of log P determination makes use of high-performance liquid chromatography. The log P of a solute can be determined by correlating its retention time with similar compounds with known log P value.

Surfactant System

Surfactants and mixtures of surfactants provide cleaning, stain removing, or laundering benefit to soiled material. Suitable surfactants can be: anionic surfactant, nonionic surfactant, zwitterionic surfactant, and combinations thereof. The surfactant system preferably comprises a combination of anionic and nonionic surfactant.

The laundry composition comprises a surfactant system at a level of from 1.0 wt % to 70 wt %, preferably from 8.0 wt % to 50 wt %, more preferably from 13 wt % to 35 wt %.

The surfactant system comprises anionic surfactant at a level of from 1.4% to 52%, preferably from 4.4% to 20%, more preferably from 5.9% to 11.5% of the liquid laundry detergent composition.

Suitable anionic surfactant can be selected from the group consisting of: sulphonate surfactant, sulphate surfactant, and mixtures thereof, preferably the anionic surfactant comprises sulphonate surfactant and sulphate surfactant, more preferably a mixture of sulphonate surfactant and sulphate surfactant. Suitable anionic surfactants also include fatty acids and their salts, which are typically added as builders. However, by nature, every anionic surfactant known in the art of detergent compositions may be used, such as disclosed in "Surfactant Science Series", Vol. 7, edited by W. M. Linfield, Marcel Dekker. However, the composition preferably comprises at least a sulphonic acid surfactant, such as a linear alkyl benzene sulphonic acid, but water-soluble salt forms may also be used. Alkyl sulphates, or mixtures thereof, are also preferred. A combination of linear alkyl benzene sulphonate and alkyl sulphate surfactant is particularly preferred, especially for improving stain removal.

Anionic sulphonate or sulphonic acid surfactants suitable for use herein include the acid and salt forms of alkylbenzene sulphonates, alkyl ester sulphonates, alkane sulphonates, alkyl sulphonated polycarboxylic acids, and mixtures thereof. Suitable anionic sulphonate or sulphonic acid surfactants include: C5-C20 alkylbenzene sulphonates, more preferably C10-C16 alkylbenzene sulphonates, more preferably C11-C13 alkylbenzene sulphonates, C5-C20 alkyl ester sulphonates, C6-C22 primary or secondary alkane sulphonates, C5-C20 sulphonated polycarboxylic acids, and any mixtures thereof, but preferably C11-C13 alkylbenzene sulphonates. The aforementioned surfactants can vary widely in their 2-phenyl isomer content.

Anionic sulphate salts suitable for use in the compositions of the invention include the primary and secondary alkyl sulphates, having a linear or branched alkyl or alkenyl moiety having from 9 to 22 carbon atoms or more preferably 12 to18 carbon atoms. Also useful are beta-branched alkyl sulphate surfactants or mixtures of commercially available materials, having a weight average (of the surfactant or the mixture) branching degree of at least 50%.

Mid-chain branched alkyl sulphates or sulphonates are also suitable anionic surfactants for use in the compositions of the invention. Preferred are the C5-C22, preferably C10-C20 mid-chain branched alkyl primary sulphates. When mixtures are used, a suitable average total number of carbon atoms for the alkyl moieties is preferably within the range of from greater than 14.5 to 17.5. Preferred mono-methyl-branched primary alkyl sulphates are selected from the group consisting of the 3-methyl to 13-methyl pentadecanol sulphates, the corresponding hexadecanol sulphates, and mixtures thereof. Dimethyl derivatives or other biodegradable alkyl sulphates having light branching can similarly be used.

When used, the alkyl alkoxylated sulphate surfactant can be a blend of one or more alkyl ethoxylated sulphates. Suitable alkyl alkoxylated sulphates include C10-C18 alkyl ethoxylated sulphates, more preferably C12-C15 alkyl ethoxylated sulphates. The anionic surfactant can comprise alkyl sulphate surfactant, wherein the alkyl sulphate surfactant has an average degree of ethoxylation of from 0.5 to 8.0, preferably from 1.0 to 5.0, more preferably from 2.0 to 3.5.

Alternatively, the anionic surfactant can comprise alkyl sulphate surfactant, wherein the alkyl sulphate surfactant has a low degree of ethoxylation, having an average degree of ethoxylation of less than 0.5, preferably less than 0.1, and more preferably is free of ethoxylation. Preferred low ethoxylation alkyl sulphate surfactants do not comprise any further alkoxylation. Preferred low ethoxylation alkyl sulphate surfactants comprise branched alkyl sulphate surfactant. The branched alkyl sulphate surfactant can comprise at least 20%, preferably from 60% to 100%, more preferably from 80% to 90% by weight of the alkyl chains of the branched alkyl sulphate surfactant of 2-branched alkyl chains. Such branched alkyl sulphates with 2-branched alkyl chains can also be described as 2-alkyl alkanol sulphates, or 2-alkyl alkyl sulphates. The branched alkyl sulphates can be neutralized by sodium, potassium, magnesium, lithium, calcium, ammonium, or any suitable amines, such as, but not limited to monoethanolamine, triethanolamine and monoisopropanolamine, or by mixtures of any of the neutralizing metals or amines. Suitable branched alkyl sulphate surfactants can comprise alkyl chains comprising from 10 to 18 carbon atoms (C10 to C18) or from 12 to 15 carbon atoms (C12 to C15), with 13 to 15 carbon atoms (C13 to C15) being most preferred. The branched alkyl sulphate surfactant can be produced using processes which comprise a hydroformylation reaction in order to provide the desired levels of 2-branching. Particularly preferred branched alkyl sulphate surfactants comprise 2-branching, wherein the 2-branching comprises from 20% to 80%, preferably from 30% to 65%, more preferably from 40% to 50% by weight of the 2-branching of methyl branching, ethyl branching, and mixtures thereof.

Suitable low ethoxylated branched alkyl sulphate surfactants can be derived from alkyl alcohols such as Lial® 145, Isalchem® 145, both supplied by Sasol, optionally blending with other alkyl alcohols in order to achieve the desired branching distributions.

Processes to make alkyl ether sulphate anionic surfactants may result in trace residual amounts of 1,4-dioxane by-product being present. The amount of 1,4-dioxane by-product within alkoxylated especially ethoxylated alkyl sulphates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. An alternative is to use alkyl sulphate anionic surfactants which comprise only low levels of ethoxylation, or even being free of ethoxylation. As such, the alkyl sulphate surfactant can have a degree of ethoxylation of less than 1.0, or less than 0.5, or even be free of ethoxylation.

Other suitable anionic surfactants for use herein include fatty methyl ester sulphonates and/or alkyl polyalkoxylated carboxylates, for example, alkyl ethoxylated carboxylates (AEC).

The anionic surfactants are typically present in the form of their salts with alkanolamines or alkali metals such as sodium and potassium.

For improved stability and grease cleaning, the liquid detergent composition can comprise a combination of linear alkyl benzene sulphonate surfactant and alkyl sulphate surfactant, preferably such that the ratio of linear alkyl benzene sulphonate surfactant to alkyl alkoxylated sulphate surfactant is from 15:1 to 0.1:1, preferably from 10:1 to 0.3:1, more preferably from 5:1 to 1:1.

The liquid detergent composition can comprise nonionic surfactant. The level of nonionic surfactant in the liquid detergent composition can be present at a level of from 1.0% to 20%, preferably from 2.5% to 15%, more preferably from 5.0% to 12.5% by weight of the composition.

Suitable nonionic surfactants include, but are not limited to, C12-C18 alkyl ethoxylates ("AE") including the so-called narrow peaked alkyl ethoxylates and C6-C12 alkyl phenol alkoxylates (especially ethoxylates and mixed ethoxy/propoxy), block alkylene oxide condensate of C6-C12 alkyl phenols, alkylene oxide condensates of C8-C22 alkanols and ethylene oxide/propylene oxide block polymers (Pluronic—BASF Corp.). An extensive disclosure of these types of surfactants is found in U.S. Pat. No. 3,929,678.

The nonionic surfactants may be condensation products of C12-C15 alcohols with from 5 to 20 moles of ethylene oxide per mole of alcohol, e.g., C12-C13 alcohol condensed with 6.5 moles of ethylene oxide per mole of alcohol.

The surfactant system can comprise branched nonionic surfactant, preferably at a level of from 0.1% to 12%, preferably from 0.5% to 10%, more preferably from 1.0% to 3.0% by weight of the composition.

Alkylpolysaccharides such as disclosed in U.S. Pat. No. 4,565,647 are also useful nonionic surfactants in the compositions of the invention.

Also suitable are alkyl polyglucoside surfactants. The alkyl polyglucoside surfactant can be a C8-C16 alkyl polyglucoside surfactant, such as a C8-C14 alkyl polyglucoside surfactant. The alkyl polyglucoside preferably has an average degree of polymerization of between 0.1 and 3, more preferably between 0.5 and 2.5, even more preferably between 1 and 2. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

The surfactant system can comprise amphoteric and/or zwitterionic surfactant at a level of from 0.1% to 2.0%, preferably from 0.1% to 1.0%, more preferably from 0.1% to 0.5% by weight of the liquid laundry detergent composition.

Suitable amphoteric surfactants include amine oxide surfactants. Amine oxide surfactants are amine oxides having the following formula: $R_1R_2R_3NO$ wherein $R_1$ is an hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. $R_1$ may be a saturated or unsaturated, substituted or unsubstituted linear or branched hydrocarbon chain.

Suitable amine oxides for use herein are for instance preferably $C_{12}$-$C_{14}$ dimethyl amine oxide (lauryl dimethylamine oxide), commercially available from Albright & Wilson, $C_{12}$-$C_{14}$ amine oxides commercially available under the trade name Genaminox® LA from Clariant or AROMOX® DMC from AKZO Nobel.

Suitable amphoteric or zwitterionic surfactants include those which are known for use in hair care or other personal care cleansing. Non-limiting examples of suitable zwitterionic or amphoteric surfactants are described in U.S. Pat. Nos. 5,104,646, 5,106,609. Suitable amphoteric surfactants include those surfactants broadly described as derivatives of aliphatic secondary and tertiary amines in which the aliphatic radical can be straight or branched chain and wherein one of the aliphatic substituents contains from 8 to 18 carbon atoms and one contains an anionic group such as carboxy, sulphonate, sulphate, phosphate, or phosphonate. Suitable amphoteric surfactants for use in the present invention include, but are not limited to: cocoamphoacetate, cocoamphodiacetate, lauroamphoacetate, lauroamphodiacetate, and mixtures thereof.

Preferably surfactants comprising saturated alkyl chains are used.

Optional Ingredients

The detergent composition may additionally comprise one or more of the following optional ingredients: dye fixative polymer other than a pyrrolidone polymer, external structurant or thickener, enzymes, enzyme stabilizers, cleaning polymers, bleaching systems, optical brighteners, hueing dyes, particulate material, non-free perfume ingredients, other odour control agents, hydrotropes, suds suppressors, fabric care benefit agents, pH adjusting agents, preservatives, non-fabric substantive dyes and mixtures thereof.

External structurant or thickener: Preferred external structurants and thickeners are those that do not rely on charge—charge interactions for providing a structuring benefit. As such, particularly preferred external structurants are uncharged external structurants, such as those selected from the group consisting of: non-polymeric crystalline, hydroxyl functional structurants, such as hydrogenated castor oil; microfibrillated cellulose; uncharged hydroxyethyl cellulose; uncharged hydrophobically modified hydroxyethyl cellulose; hydrophobically modified ethoxylated urethanes; hydrophobically modified non-ionic polyols; and mixtures thereof.

Suitable polymeric structurants include naturally derived and/or synthetic polymeric structurants.

Examples of naturally derived polymeric structurants of use in the present invention include: microfibrillated cellulose, hydroxyethyl cellulose, hydrophobically modified hydroxyethyl cellulose, carboxymethyl cellulose, polysaccharide derivatives and mixtures thereof. Non-limiting examples of microfibrillated cellulose are described in WO 2009/101545 A1. Suitable polysaccharide derivatives include: pectine, alginate, arabinogalactan (gum Arabic), carrageenan, gellan gum, xanthan gum, guar gum and mixtures thereof.

Examples of synthetic polymeric structurants or thickeners of use in the present invention include: polycarboxylates, hydrophobically modified ethoxylated urethanes (HEUr), hydrophobically modified non-ionic polyols and mixtures thereof.

Preferably, the aqueous liquid detergent composition has a viscosity of 50 to 5,000, preferably 75 to 1,000, more preferably 100 to 500 mPa·s, when measured at a shear rate of 100 s-1, at a temperature of 20° C. For improved phase stability, and also improved stability of suspended ingredients, the aqueous liquid detergent composition has a viscosity of 50 to 250,000, preferably 5,000 to 125,000, more preferably 10,000 to 35,000 mPa·s, when measured at a shear rate of 0.05 s-1, at a temperature of 20° C.

Cleaning polymers: The detergent composition preferably comprises a cleaning polymer. Such cleaning polymers are believed to at least partially lift the stain from the textile fibres and enable the enzyme system to more effectively break up the complexes comprising mannan and other polysaccharide. Suitable cleaning polymers provide for broad-range soil cleaning of surfaces and fabrics and/or suspension of the soils. Non-limiting examples of suitable cleaning polymers include: amphiphilic alkoxylated grease cleaning polymers; clay soil cleaning polymers; soil release polymers; and soil suspending polymers. A preferred cleaning polymer is obtainable by free-radical copolymerization of at least one compound of formula (I), (I)

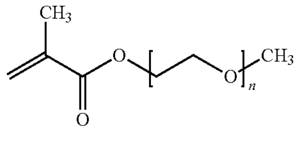

in which n is equal to or greater than 3 for a number, with at least one compound of formula (II), (II)

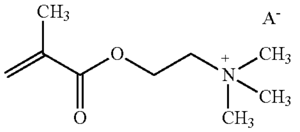

in which $A^-$ represents an anion, in particular selected from halides such as fluoride, chloride, bromide, iodide, sulphate, hydrogen sulphate, alkyl sulphate such as methyl sulphate, and mixtures thereof. Such polymers are further described in EP3196283A1.

For similar reasons, polyester based soil release polymers, such as SRA300, supplied by Clariant are also particularly preferred.

Other useful cleaning polymers are described in US20090124528A1. The detergent composition may comprise amphiphilic alkoxylated grease cleaning polymers, which may have balanced hydrophilic and hydrophobic properties such that they remove grease particles from fabrics and surfaces. The amphiphilic alkoxylated grease cleaning polymers may comprise a core structure and a plurality of alkoxylate groups attached to that core structure. These may comprise alkoxylated polyalkyleneimines, for example. Such compounds may comprise, but are not limited to, ethoxylated polyethyleneimine, ethoxylated hexamethylene diamine, and sulphated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF. The alkoxylated polyalkyleneimines may have an inner polyethylene oxide block and an outer polypropylene oxide block. The detergent compositions may comprise from 0.1% to 10%, preferably, from 0.1% to 8.0%, more preferably from 0.1% to 2.0%, by weight of the detergent composition, of the cleaning polymer.

Polymer Deposition Aid: The laundry detergent composition can comprise from 0.1% to 7.0%, more preferably from 0.2% to 3.0%, of a polymer deposition aid. As used herein, "polymer deposition aid" refers to any cationic polymer or combination of cationic polymers that significantly enhance deposition of a fabric care benefit agent onto the fabric during laundering. Suitable polymer deposition aids include a cationic polysaccharide and/or a copolymer, with cationic polysaccharide being preferred. The cationic polymer can also be selected from the group consisting of: poly (diallyldimethylammonium chloride/co-acrylic acid), poly (acrylamide-methacrylamidopropyltrimethyl ammonium chloride), poly (acrylamide-methacrylamidopropyltrimethyl ammonium chloride/co-acrylic acid), poly (acrylamide-co-diallyldimethylammonium chloride/co-acrylic acid), poly (acrylamide-co-N,N, N-trimethyl aminoethyl acrylate), poly (diallyldimethylammonium chloride/co-vinyl alcohol), poly (diallyldimethylammonium chloride/acrylamide), and mixtures thereof. The diallyldimethylammonium chloride and co-acrylic acid monomers can be present in a mol ratio of from 50:50 to 90:10, preferably from 55:45 to 85:15, more preferably from 60:40 to 70:30. For poly (diallyldimethylammonium chloride/co-acrylic acid) the preferred ratio of diallyldimethylammonium chloride to acrylic acid is between approximately 90:10 and 50:50. The preferred cationic polymer is poly (diallyldimethylammonium chloride/co-acrylic acid) copolymer at a 65/35 mole ratio with a molecular weight of approximately 450,000. Poly (diallyldimethylammonium chloride/co-acrylic acid) copolymer may be further described by the nomenclature Polyquaternium-22 or PQ22 as named under the International Nomenclature for Cosmetic Ingredients. Poly (diallyldimethylammonium chloride/acrylamide) may be further described by the nomenclature Polyquaternium-7 or PQ7 as named under the International Nomenclature for Cosmetic Ingredients.

"Fabric care benefit agent" as used herein refers to any material that can provide fabric care benefits. Non-limiting examples of fabric care benefit agents include: silicone derivatives, oily sugar derivatives, dispersible polyolefins, polymer latexes, cationic surfactants and combinations thereof. Preferably, the deposition aid is a cationic or amphoteric polymer. The cationic charge density of the polymer preferably ranges from 0.05 milliequivalents/g to 6.0 milliequivalents/g. The charge density is calculated by dividing the number of net charge per repeating unit by the molecular weight of the repeating unit. In one embodiment, the charge density varies from 0.1 milliequivalents/g to 3.0 milliequivalents/g. The positive charges could be on the backbone of the polymers or the side chains of polymers.

Organic builder and/or chelant: The laundry detergent composition can comprise from 0.6% to 10%, preferably from 2.0 to 7.0% by weight of one or more organic builder and/or chelants. Suitable organic builders and/or chelants are selected from the group consisting of: MEA citrate, citric acid, aminoalkylenepoly (alkylene phosphonates), alkali metal ethane 1-hydroxy disphosphonates, and nitrilotrimethylene, phosphonates, diethylene triamine penta (methylene phosphonic acid) (DTPMP), ethylene diamine tetra (methylene phosphonic acid) (EDTMP), hexamethylene diamine tetra(methylene phosphonic acid), hydroxy-ethylene 1,1 diphosphonic acid (HEDP), hydroxyethane dimethylene phosphonic acid, ethylene di-amine di-succinic acid (EDDS), ethylene diamine tetraacetic acid (EDTA), hydroxyethylethylenediamine triacetate (HEDTA), nitrilotriacetate (NTA), methylglycinediacetate (MGDA), iminodisuccinate (IDS), hydroxyethyliminodisuccinate (HIDS), hydroxyethyliminodiacetate (HEIDA), glycine diacetate (GLDA), diethylene triamine pentaacetic acid (DTPA), catechol sulphonates such as Tiron™ and mixtures thereof.

Enzyme stabiliser: Enzymes can be stabilized using any known stabilizer system such as calcium and/or magnesium compounds, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth)acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof.

Hueing dyes: The detergent composition may comprise fabric hueing agent (sometimes referred to as shading, bluing, or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and combinations thereof.

Optical brighteners: The detergent composition may comprise, based on the total detergent composition weight, from 0.005% to 2.0%, preferably 0.01% to 0.1% of a fluorescent agent (optical brightener). Fluorescent agents are well known, and many fluorescent agents are available commercially. Usually, these fluorescent agents are supplied and used in the form of their alkali metal salts, for example, the sodium salts. Preferred classes of fluorescent agent are: Di-styryl biphenyl compounds, e.g. Tinopal® CBS-X, Diamine stilbene di-sulphonic acid compounds, e.g. Tinopal® DMS pure Xtra and Blankophor® HRH, and Pyrazoline compounds, e.g. Blankophor® SN. Preferred fluorescers are: sodium 2-(4-styryl-3-sulphophenyl)-2H-napthol [1,2-d] trazole, disodium 4,4'-bis{[(4-anilino-6-(N methyl-N-2 hydroxyethyl) amino 1,3,5-triazin-2-yl)]amino}stilbene-2-2' disulphonate, disodium 4,4'-bis{[(4-anilino-6-morpholino-1,3,5-triazin-2-yl)]amino}stilbene-2-2' disulphonate, and disodium 4,4'-bis(2-sulphoslyryl) biphenyl.

Hydrotrope: The detergent composition may comprise, based on the total detergent composition weight, from 0 to 30%, preferably from 0.5 to 5%, more preferably from 1.0 to 3.0%, which can prevent liquid crystal formation. The addition of the hydrotrope thus aids the clarity/transparency of the composition. Suitable hydrotropes comprise but are not limited to urea, salts of benzene sulphonate, toluene sulphonate, xylene sulphonate or cumene sulphonate. Preferably, the hydrotrope is selected from the group consisting of propylene glycol, xylene sulphonate, ethanol, and urea to provide optimum performance.

Non-free perfume ingredients: The composition can also comprise non-free perfume ingredients, such as perfume capsules, pro-perfumes, and mixtures thereof, preferably perfume capsules, such as described later. The composition can comprise perfume capsules at a level of from 0.05% to 5.0%, preferably from 0.1% to 3.0%, more preferably from 0.1% to 1.5% by weight of the composition of perfume capsules Particles: The composition can also comprise particles, especially when the composition further comprises a structurant or thickener. The composition may comprise, based on the total composition weight, from 0.02% to 10%, preferably from 0.1% to 4.0%, more preferably from 0.25% to 2.5% of particles. Said particles include beads, pearlescent agents, capsules, and mixtures thereof.

Suitable capsules are typically formed by at least partially, preferably fully, surrounding a benefit agent with a wall material. Preferably, the capsule is a perfume capsule, wherein said benefit agent comprises one or more perfume raw materials. The capsule wall material may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol, resorcinol-based materials, poly-isocyanate-based materials, acetals (such as 1,3,5-triol-benzene-gluteraldehyde and 1,3,5-triol-benzene melamine), starch, cellulose acetate phthalate and mixtures thereof. Preferably, the capsule wall comprises melamine and/or a polyacrylate based material. The perfume capsule may be coated with a deposition aid, a cationic polymer, a non-ionic polymer, an anionic polymer, or mixtures thereof. Preferably, the perfume capsules have a volume weighted mean particle size from 0.1 microns to 100 microns, preferably from 0.5 microns to 60 microns. Especially where the composition comprises capsules having a shell formed at least partially from formaldehyde, the composition can additionally comprise one or more formaldehyde scavengers.

Suitable pro-perfumes include Michael adducts (e.g., beta-amino ketones), aromatic or non-aromatic imines (Schiff bases), oxazolidines, beta-keto esters, and orthoesters. Suitable pro-perfumes also include compounds comprising one or more beta-oxy or beta-thiocarbonyl moieties capable of releasing a perfume ingredient, for example, an alpha, beta-unsaturated ketone, aldehyde or carboxylic ester. Certain silicon-containing compounds may be suitable pro-perfumes, such as silicic acid esters, polysilicic acid esters, and certain silicone polymers. Suitable pro-perfumes also include reaction products between a polymeric amine and perfume ingredients such as perfume aldehydes and ketones. Non-limiting examples of suitable polymeric amines include polymers based on polyalkylimines, such as polyethyleneimine (PEI), or polyvinylamine (PVAm). Non-limiting examples of monomeric (non-polymeric) amines include hydroxyl amines, such as aminoethanol and its alkyl substituted derivatives, and aromatic amines such as anthranilates. The composition can comprise from 0.05% to 20%, preferably from 0.1% to 10%, more preferably from 0.2% to 2.0% of the free perfume.

The liquid laundry detergent compositions of the present invention preferably do not comprise a bleach.

Method of Laundering Fabrics:

The laundry detergent compositions of the present invention are used to launder fabrics. In particular, laundry detergent composition comprising the cationic polymer, as described herein, can be used to improve deposition of perfume ingredients, especially the perfume ingredients described herein.

The compositions of the present invention are particularly effective for improving the deposition of such perfume ingredients on to fabrics comprising cotton fibres, including mixed cotton/synthetic fibres.

In suitable methods and uses, the laundry detergent composition can be diluted to provide a wash liquor having a total surfactant concentration of greater than 300 ppm, preferably from 400 ppm to 2,500 ppm, more preferably from 600 ppm to 1000 ppm. The fabric is then washed in the wash liquor, and preferably rinsed.

The laundry detergent compositions may be used for automatic treatment processes, such as use in an automatic washing machine with or without automatic detergent dispensing capability or so called “automatic dispensing” or “auto-dosing”. Such automatic dispensing has been provided in newer automatic cleaning machines, which employ one or more automatic dosing devices to automatically dispense a single dose of a cleaning detergent from a bulk cartridge that contains multiple doses of such cleaning detergent into the main cleaning chamber during each cleaning cycle

METHODS

A) pH Measurement:

The pH is measured, at 25° C., using a Santarius PT-10P PH meter with gel-filled probe (such as the Toledo probe, part number 52 000 100), calibrated according to the instruction manual. The pH is measured in a 10% dilution in demineralised water (i.e. 1 part laundry detergent composition and 9 parts demineralised water).

B) Method of Measuring Viscosity:

The viscosity is measured using an AR 2000 rheometer from TA instruments using a cone and plate geometry with a 40 mm diameter and an angle of 1°. The viscosity at the different shear rates is measured via a logarithmic shear rate sweep from 0.1 $s^{-1}$ to 1200 $s^{-1}$ in 3 minutes time at 20° C. Low shear viscosity is measured at a continuous shear rate of 0.05 $s^{-1}$.

C) Calculation of log P:

In order to conduct the calculations involved in the computed-value test methods described herein, the starting information required includes the identity, weight percent, and molar percent of each PRM in the perfume being tested, as a proportion of that perfume, wherein all PRMs in the perfume composition are included in the calculations. Additionally, for each of those PRMs, the molecular structure, and the values of various computationally-derived molecular descriptors are also required, as determined in accordance with the Test Method for the Generation of Molecular Descriptors described herein.

Generation of Molecular Descriptors

For each PRM in a perfume mixture or composition, its molecular structure is used to compute various molecular descriptors. The molecular structure is determined by the graphic molecular structure representations provided by the Chemical Abstract Service ("CAS"), a division of the American Chemical Society, Columbus, Ohio, U.S.A. These molecular structures may be obtained from the CAS Chemical Registry System database by looking up the index name or CAS number of each PRM. For PRMs, which at the time of their testing are not yet listed in the CAS Chemical Registry System database, other databases or information sources may be used to determine their structures. For a PRM which has potentially more than one isomer present, the molecular descriptor computations are conducted using only one isomer to represent that PRM. Of all the isomers of a given PRM, the one that is selected to represent that PRM is the isomer whose molecular structure is the most prevalent by weight % in the formulation. The structures for other potential isomers of that PRM are excluded from the computations. The molecular structure of the most prevalent isomer is paired with the total concentration of that PRM, where the concentration reflects the presence of all the isomers of that PRM.

A molecule editor or molecular sketching software program, such as ChemDraw (CambridgeSoft/PerkinElmer Inc., Waltham, Massachusetts, U.S.A.), is used to duplicate the 2-dimensional molecular structure representing each PRM. Molecular structures should be represented as neutral species (quaternary nitrogen atoms are allowed) with no disconnected fragments (e.g., single structures with no counter ions). The winMolconn program described below can convert any deprotonated functional groups to the neutral form by adding the appropriate number of hydrogen atoms and will discard the counter ion.

For each PRM, the molecular sketching software is used to generate a file which describes the molecular structure of the PRM. The file(s) describing the molecular structures of the PRMs is subsequently submitted to the computer software program winMolconn, version 1.0.1.3 (Hall Associates Consulting, Quincy, Massachusetts, U.S.A., www.molconn.com), in order to derive various molecular descriptors for each PRM. As such, it is the winMolconn software program which dictates the structure notations and file formats that are acceptable options. These options include either a MACCS SDF formatted file (i.e., a Structure-Data File); or a Simplified Molecular Input Line Entry Specification (i.e., a SMILES string structure line notation) which is commonly used within a simple text file, often with a ".smi" or ".txt" file name extension. The SDF file represents each molecular structure in the format of a multi-line record, while the syntax for a SMILES structure is a single line of text with no white space. A structure name or identifier can be added to the SMILES string by including it on the same line following the SMILES string and separated by a space, e.g.: C1=CC=CC=C1 benzene.

The winMolconn software program is used to generate numerous molecular descriptors for each PRM, which are then output in a table format. Specific molecular descriptors derived by winMolconn are subsequently used as inputs (i.e., as variable terms in mathematical equations) for a variety of computer model test methods in order to calculate values such as: saturation Vapour Pressure (VP); Boiling Point (BP); logarithm of the Octanol/Water Partition Coefficient (log P); Odour Detection Threshold (ODT); Malodour Reduction Value (MORV); and/or Universal Malodour Reduction Value (Universal MORV) for each PRM. The molecular descriptor labels used in the models' test method computations are the same labels reported by the winMolconn program, and their descriptions and definitions can be found listed in the winMolconn documentation. The following is a generic description of how to execute the winMolconn software program and generate the required molecular structure descriptors for each PRM in a composition.

Computing Molecular Structure Descriptors using winMolconn:

1) Assemble the molecular structure for one or more perfume ingredients in the form of a MACCS Structure-Data File, also called an SDF file, or as a SMILES file.
2) Using version 1.0.1.3 of the winMolconn program, running on an appropriate computer, compute the full complement of molecular descriptors that are available from the program, using the SDF or SMILES file described above as input.
    a. The output of winMolconn is in the form of an ASCII text file, typically space delimited, containing the structure identifiers in the first column and respective molecular descriptors in the remaining columns for each structure in the input file.
3) Parse the text file into columns using a spreadsheet software program or some other appropriate technique. The molecular descriptor labels are found on the first row of the resulting table.
4) Find and extract the descriptor columns, identified by the molecular descriptor label, corresponding to the inputs required for each model.

Note that the winMolconn molecular descriptor labels are case-sensitive.

Computing the Logarithm of the Octanol/Water Partition Coefficient (Log P)

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

D) Measuring log $P_{(o/w)}$:

The log P (n-Octanol/Water) of a perfume ingredient can be measured using the shake-flask method, as described below:

The determination of the partition coefficient should be carried out with high purity analytical grade n-octanol. Distilled, preferably double distilled water is used. Glass or quartz apparatus should be employed for the measurement. For ionizable compounds, buffer solutions in place of water can be used if needed. Before a partition coefficient is determined, the phases of the solvent system are mutually saturated by shaking at the temperature of the experiment in the range 20° C. to 25° C. (preferably 21° C.). To do this, it is practical to shake two large stock bottles of high purity analytical grade n-octanol or water each with a sufficient quantity of the other solvent for 24 hours on a mechanical shaker and then to let them stand long enough to allow the phases to separate and to achieve a saturation state.

The entire volume of the two-phase system should nearly fill the test vessel. This will help prevent loss of material due to volatilization. The volume ratio and quantities of substance to be used are fixed by the following: The minimum quantity of test substance required for the analytical procedure, and the limitation of a maximum concentration in either phase of 0.01 mol per litre. Three tests are carried out. In the first, a 1:1 volume ratio of n-octanol to water is used; in the second, this ratio is divided by two; and in the third, this ratio is multiplied by two (1:1, 1:2, 2:1). A stock solution is prepared in n-octanol pre-saturated with water. The concentration of this stock solution should be precisely determined before it is employed in the determination of the partition coefficient. This solution should be stored under conditions which ensure its stability.

Duplicate test vessels containing the required, accurately measured amounts of the two solvents together with the necessary quantity of the stock solution should be prepared for each of the test conditions.

The n-octanol phases should be measured by volume. The test vessels should either be placed in a suitable shaker or shaken by hand. When using a centrifuge tube, a recommended method is to rotate the tube quickly through 180° about its transverse axis so that any trapped air rises through the two phases. 50 such rotations are usually sufficient for the establishment of the partition equilibrium. To be certain, 100 rotations in five minutes are recommended.

When necessary, in order to separate the phases, centrifugation of the mixture should be carried out. This should be done in a laboratory centrifuge maintained at room temperature, or, if a non-temperature-controlled centrifuge is used, the centrifuge tubes should be kept for equilibration at the test temperature for at least one hour before analysis.

For the determination of the partition coefficient, it is necessary to determine the concentrations of the test substance in both phases. This may be done by taking an aliquot of each of the two phases from each tube for each test condition and analysing them by the chosen procedure. The total quantity of substance present in both phases should be calculated and compared with the quantity of the substance originally introduced.

The aqueous phase should be sampled by a procedure that minimizes the risk of including traces of n-octanol: a glass syringe with a removable needle can be used to sample the water phase. The syringe should initially be partially filled with air. Air should be gently expelled while inserting the needle through the n-octanol layer. An adequate volume of aqueous phase is withdrawn into the syringe. The syringe is quickly removed from the solution and the needle detached. The contents of the syringe may then be used as the aqueous sample. The concentration in the two separated phases should preferably be determined by a substance-specific method. Examples of analytical methods which may be appropriate are: photometric methods, gas chromatography, high-performance liquid chromatography (HPLC), with HPLC being preferred. Where HPLC is used, a liquid chromatograph, fitted with a pulse-free pump and a suitable detection device, is used. The use of an injection valve with injection loops is recommended. The presence of polar groups in the stationary phase may seriously impair the performance of the HPLC column. Therefore, stationary phases should have the minimal percentage of polar groups. Commercial microparticulate reverse-phase packings or ready-packed columns can be used. A guard column may be positioned between the injection system and the analytical column.

HPLC grade methanol and HPLC grade water are used to prepare the eluting solvent, which is degassed before use. Isocratic elution should be employed. Methanol/water ratios with a minimum water content of 25% should be used. Typically, a 3:1 (v/v) methanol-water mixture is satisfactory for eluting compounds of log P 6 within an hour, at a flow rate of 1 ml/min. For compounds of high log P it may be necessary to shorten the elution time (and those of the reference compounds) by decreasing the polarity of the mobile phase or the column length.

Substances with very low solubility in n-octanol tend to give abnormally low log Pow values with the HPLC method; the peaks of such compounds sometimes accompany the solvent front. This is probably due to the fact that the partitioning process is too slow to reach the equilibrium in the time normally taken by an HPLC separation. Decreasing the flow rate and/or lowering the methanol/water ratio may then be effective to arrive at a reliable value.

Test and reference compounds should be soluble in the mobile phase in sufficient concentrations to allow their detection. Only in exceptional cases may additives be used with the methanol-water mixture, since additives will change the properties of the column. For chromatograms with additives it is mandatory to use a separate column of the same type. If methanol-water is not appropriate, other organic solvent-water mixtures call be used, e.g. ethanol-water or acetonitrile-water.

The pH of the eluent is critical for ionizable compounds. It should be within the operating pH range of the column, which is usually between 2 and 8. Buffering is recommended. Care must be taken to avoid salt precipitation and column deterioration which occur with some organic phase/buffer mixtures. HPLC measurements with silica-based stationary phases above pH 8 are not advisable since the use of an alkaline, mobile phase may cause rapid deterioration in the performance of the column.

Compounds to be used for test or calibration purposes are dissolved in the mobile phase if possible.

The mean P from all determinations are expressed as its logarithm (base 10), to provide the log P value.

EXAMPLES

The following comparative test was run, using inventive laundry detergent composition 1 comprising a copolymer of diallyldimethylammonium chloride and acrylic acid (polyquaternium 22) and a perfume comprising hydrophophilic perfume ingredients of use in the present invention, and comparative laundry detergent composition A, having the same composition but not comprising polyquaternium 22.

Laundry Test:

100% cotton fabric cut into 30×30 cm squares were washed in a mixed cotton/polycotton load of total 3 kg in a front load washing machine (Miele 1935) at 40° C. cotton short setting, with 2 rinses, using 2.67 mmol/L Ca (15 gpg) water hardness. A 55 ml dose of the respective detergent was added to a dosing cup and placed inside the washing machine. After the wash cycle was finished, the full load was tumbled (using a Miele Novotronic, type: TD7634) for about 1 hour.

TABLE 1

Inventive detergent composition (Ex 1) and comparative laundry detergent composition (Ex A) used in the laundry test:

| | Ex 1 wt % | Ex A wt % |
|---|---|---|
| C10-C13 linear alkyl benzene sulphonate | 3.7 | 3.7 |
| Linear C12-C15 AE3.0S[1] | 2.7 | 2.7 |
| linear C12-C14 EO7[2] | 2.3 | 2.3 |
| C12-C14 dimethyl aminoxide | 0.4 | 0.4 |
| TPK Fatty Acid | 2.3 | 2.3 |

TABLE 1-continued

Inventive detergent composition (Ex 1) and comparative laundry detergent composition (Ex A) used in the laundry test:

| | Ex 1 wt % | Ex A wt % |
|---|---|---|
| Citric Acid | 1.75 | 1.75 |
| Copolymer of diallyldimethylammonium chloride and acrylic acid[3] | 1.38 | — |
| PEG-PVAc Polymer[4] | 0.6 | 0.6 |
| Enzymes | 0.008 | 0.008 |
| Ethylene diamine tetra(methylene phosphonic) acid (EDTMP) | 0.6 | 0.6 |
| Perfume (see table 2) | 1.25 | 1.25 |
| Ethanol | 0.34 | 0.34 |
| Propylene Glycol | 0.34 | 0.34 |
| Sodium Cumen sulfonate | 1.15 | 1.15 |
| Mono Ethanol amine | 0.26 | 0.26 |
| Sodium hydroxide | 1.8 | 1.8 |
| Hydrogenated castor oil | 0.3 | 0.3 |
| Water & minors | to 100% | to 100% |
| pH | 8 | 8 |

[1]Supplied by Tensachem under the tradename TENSAGEX EOC970B

[2]Supplied by Sasol under the tradename MARLIPAL 1216/7 UA P&G

[3]Polyquaternium 22, supplied by Lubrizol under the tradename Merquat 281

[4]Polyvinyl acetate grafted polyethylene oxide copolymer having a polyethylene oxide backbone and multiple polyvinyl acetate side chains, supplied by BASF, Germany The composition of the perfume used in the comparative test is given in table 2.

TABLE 2

Composition of perfume used in the composition of inventive example 1 and comparative example A:

| Perfume ingredient | IUPAC Name | CLogP | wt % |
|---|---|---|---|
| Acetophenone | Acetophenone | 1.635 | 1.982 |
| **Allyl amyl glycolate*** | **allyl 2-(isopentyloxy)acetate** | **2.572** | **3.072** |
| Alpha pinene | 2,6,6-trimethylbicyclo(3.1.1)hept-2-ene | 4.138 | 2.246 |
| **Anisic aldehyde*** | **4-methoxybenzaldehyde** | **1.709** | **2.246** |
| **Benzyl acetate*** | **benzyl acetate** | **1.936** | **2.478** |
| Beta napthol methyl ether | 2-methoxynaphthalene | 3.507 | 2.610 |
| Borneol crystals | 1,7,7-trimethylbicyclo(2.2.1)heptan-2-ol | 2.584 | 2.544 |
| Citronellol | 3,7-dimethyloct-6-en-1-ol | 3.562 | 2.577 |
| Citronellyl nitrile | 3,7-dimethyloct-6-enenitrile | 3.402 | 2.494 |
| Clonal | dodecanenitrile | 5.119 | 2.990 |
| Delta damascone | (Z)-1-((1R,2S)-2,6,6-trimethylcyclohex-3-en-1-yl)but-2-en-1-one | 3.554 | 3.171 |
| Delta muscenone | (E)-3-methylcyclopentadec-4-en-1-one | 5.052 | 3.898 |
| Ethyl maltol | 2-ethyl-3-hydroxy-4H-pyran-4-one | 0.504 | 2.081 |
| **Ethyl methyl phenyl glycidate*** | **ethyl 3-methyl-3-phenyloxirane-2-carboxylate** | **2.402** | **3.403** |
| Ethyl safranate | ethyl 2,6,6-trimethylcyclohexa-1,3-diene-1-carboxylate | 3.613 | 3.204 |
| Exaltolide total | oxacyclohexadecan-2-one | 5.189 | 3.964 |
| Florhydral | 3-(3-isopropylphenyl)butanal | 3.607 | 3.138 |
| Geraniol | (E)-3,7-dimethylocta-2,6-dien-1-ol | 3.409 | 2.544 |
| Helvetolide | 2-(1-(3,3-dimethylcyclohexyl)ethoxy)-2-methylpropyl propionate | 5.226 | 3.931 |
| Hydroxycitronellal | 7-hydroxy-3,7-dimethyloctanal | 2.076 | 2.841 |
| Ionone beta | (E)-4-(2,6,6-trimethylcyclohex-1-en-1-yl)but-3-en-2-one | 3.824 | 3.171 |
| **Isoamyl butyrate*** | **isopentyl butyrate** | **2.913** | **2.610** |
| **Laevo carvone*** | **2-methyl-5-(prop-1-en-2-yl)cyclohex-2-en-1-one** | **2.802** | **3.006** |
| Linalool | 3,7-dimethylocta-1,6-dien-3-ol | 3.285 | 2.544 |
| Lilial | 3-(4-(tert-butyl)phenyl)-2-methylpropanal | 4.185 | 3.370 |
| Linalyl propionate | 3,7-dimethylocta-1,6-dien-3-yl propionate | 4.204 | 3.700 |
| Methyl Beta-napthyl ketone | 1-(naphthalen-2-yl)ethan-1-one | 3.039 | 2.810 |
| **Methyl salicylate*** | **methyl 2-hydroxybenzoate** | **2.434** | **2.511** |
| Neo Hivernal | 3-(3,3-dimethyl-2,3-dihydro-1H-inden-5-yl)propanal mixt. wth 3-(1,1-dimethyl-2,3-dihydro-1H-inden-5-y1)propanal | 4.007 | 3.337 |

TABLE 2-continued

Composition of perfume used in the composition of inventive example 1 and comparative example A:

| Perfume ingredient | IUPAC Name | CLogP | wt % |
|---|---|---|---|
| Octyl Aldehyde | octanal | 3.241 | 2.114 |
| **Para cresyl methyl ether*** | **1-methoxy-4-methylbenzene** | **2.701** | **2.015** |
| Para hydroxy phenyl butanone | 4-(4-hydroxyphenyl)butan-2-one | 1.425 | 2.709 |
| **Phenyl ethyl dimethyl carbinol*** | **2-methyl-4-phenylbutan-2-ol** | **2.699** | **2.709** |
| Pomarose | (2Z,5Z)-5,6,7-trimethylocta-2,5-dien-4-one | 3.531 | 2.742 |
| Terpinyl acetate | 2-(4-methylcyclohex-3-en-1-yl)propan-2-yl acetate | 3.907 | 3.238 |
| | TOTAL | | 100.000 |

*of use in the present invention (in bold)

The load was washed and dried three consecutive times, then placed back into a washing machine After a fourth wash cycle, the wet cotton tracers were separated and packed in aluminium foil until they were ready to be analysed for headspace.

Headspace Analysis:

The headspace was analysed using solid phase mixed extraction (SPME) chromatography using the following procedure:

1. One piece of 4×4 cm cotton tracers were transferred to 25 ml headspace vials.
2. The fabric samples were equilibrated for 10 minutes at 65° C.
3. The headspace above the fabrics was sampled via SPME (50/30 μm DVB/Carboxen/PDMS) for 5 minutes.
4. The SPME fiber was subsequently thermally desorbed into the GC.'
5. The analytes were analyzed by GC/MS (GC: Agilent 8890 and MS: Agilent 5977B MS) in full scan mode. The total perfume HS response and perfume headspace composition above the tested legs could be determined.

The results are given below in Table 3:

TABLE 3

Results of headspace analysis from the wet cotton tracers after laundering:

| Perfume ingredient | IUPAC | Ex 1 (PQ22) nmol/L | Ex A (nil-PQ22) nmol/L | % increase Ex 1 vs Ex A % |
|---|---|---|---|---|
| **Allyl amyl glycolate*** | **allyl 2-(isopentyloxy)acetate** | **0.233** | **4.901** | **2003%** |
| Alpha pinene | 2,6,6-trimethylbicyclo(3.1.1)hept-2-ene | 0.909 | 0.605 | −33% |
| **Anisic Aldehyde*** | **4-methoxybenzaldehyde** | **0.184** | **1.755** | **854%** |
| **Benzyl acetate*** | **benzyl acetate** | **0.227** | **4.405** | **1840%** |
| Beta naphthol methyl ether | 2-methoxynaphthalene | 9.801 | 19.990 | 104% |
| Citronellol | 3,7-dimethyloct-6-en-1-ol | 1.244 | 2.582 | 108% |
| Citronellyl nitrile | 3,7-dimethyloct-6-enenitrile | 1.498 | 8.338 | 457% |
| Delta muscenone | (E)-3-methylcyclopentadec-4-en-1-one | 23.019 | 16.689 | −27% |
| **Ethyl methyl phenyl glycidate*** | **ethyl 3-methyl-3-phenyloxirane-2-carboxylate** | **0.000** | **0.038** | **inf** |
| Ethyl safranate | ethyl 2,6,6-trimethylcyclohexa-1,3-diene-1-carboxylate | 2.207 | 2.777 | 26% |
| Exaltolide total | oxacyclohexadecan-2-one | 25.157 | 16.977 | −33% |
| Florhydral | 3-(3-isopropylphenyl)butanal | 3.660 | 1.455 | −60% |
| Helvetolide | 2-(1-(3,3-dimethylcyclohexyl)ethoxy)-2-methylpropyl propionate | 9.425 | 4.732 | −50% |
| Ionone beta | (E)-4-(2,6,6-trimethylcyclohex-1-en-1-yl)but-3-en-2-one | 2.299 | 2.72 | 18% |
| **Isoamyl butyrate*** | **isopentyl butyrate** | **0.074** | **6.501** | **8685%** |
| **Laevo carvone*** | **2-methyl-5-(prop-1-en-2-yl)cyclohex-2-en-1-one** | **1.978** | **11.231** | **468%** |
| Lilial | 3-(4-(tert-butyl)phenyl)-2-methylpropanal | 13.175 | 5.941 | −55% |
| Linalool | 3,7-dimethylocta-1,6-dien-3-ol | 1.132 | 1.613 | 42% |
| Linalyl propionate | 3,7-dimethylocta-1,6-dien-3-yl propionate | 12.559 | 6.315 | −50% |
| Methyl Beta-napthyl ketone | 1-(naphthalen-2-y1)ethan-1-one | 0.610 | 2.243 | 268% |

TABLE 3-continued

Results of headspace analysis from the wet cotton tracers after laundering:

| Perfume ingredient | IUPAC | Ex 1 (PQ22) nmol/L | Ex A (nil-PQ22) nmol/L | % increase Ex 1 vs Ex A % |
|---|---|---|---|---|
| **Methyl salicylate*** | **methyl 2-hydroxybenzoate** | **2.468** | **25.049** | **915%** |
| Neo Hivernal | 3-(3,3-dimethyl-2,3-dihydro-1H-inden-5-y1)propanal mixt. wth 3-(1,1-dimethyl-2,3-dihydro-1H-inden-5-y1)propanal | 0.328 | 0.139 | −58% |
| Octyl aldehyde | octanal | 2.644 | 3.072 | 16% |
| **Para cresyl methyl ether*** | **1-methoxy-4-methylbenzene** | **0.319** | **44.122** | **13731%** |
| **Phenyl ethyl dimethyl carbinol*** | **2-methyl-4-phenylbutan-2-ol** | **0.036** | **0.434** | **1106%** |
| | TOTAL | 115.19 | 194.62 | 69% |

*of use in the present invention (in bold)

In the above table, the perfume ingredients that were not detected in the headspace analysis were omitted.

Further examples of compositions of the present invention are given in table 4, below

TABLE 4 further examples of compositions of the present invention.

| | Ex 2 wt % | Ex 3 wt % |
|---|---|---|
| C10-C13 linear alkyl benzene sulphonate | 7 | 2 |
| C12-C15 AE3.0S | 1.5 | 4 |
| linear C12-C14 EO7[3] | 1 | 3 |
| C12-C14 dimethyl aminoxide | 0.1 | 0.4 |
| TPK Fatty Acid | 0.5 | 3 |
| Citric Acid | 0.5 | 1.5 |
| Copolymer of diallyldimethylammonium chloride and acrylic acid[3] | 0.5 | 1 |
| PEG-PVAc Polymer[4] | 0.2 | 0.3 |
| Enzymes | 0.001 | 0.001 |
| Ethylene diamine tetra(methylene phosphonic) acid (EDTMP) | 0.4 | 0.3 |
| Perfumes as disclosed in table 5 | 0.8 | 2 |
| Ethanol | 0.2 | 0.4 |
| Propylene Glycol | 0.4 | 0.2 |
| Sodium Cumen sulfonate | 1 | 1.5 |
| Mono Ethanol amine | 0.3 | 0.2 |
| Sodium hydroxide | 1.8 | 1.8 |
| Hydrogenated castor oil | 0.3 | 0.3 |
| Water & minors | to 100% | to 100% |
| pH | 8 | 8 |

The compositions of table 4 can comprise one of the perfumes given in table 5, below.

TABLE 5

Perfumes of use in the compositions of examples 2 and 3.

| | Perfume 1 wt % | Perfume 2 wt % | Perfume 3 wt % | Perfume 4 wt % |
|---|---|---|---|---|
| Allyl Amyl Glycolate | 1.5 | 1.0 | — | — |
| Anisic Aldehyde | — | — | 1.0 | 2.0 |
| Benzyl Acetate | — | 4.0 | 7.0 | 2.0 |
| Iso Amyl Butyrate | — | 0.2 | 0.2 | — |
| Laevo carvone | 0.3 | 1.0 | — | — |
| Methyl Salicylate | 0.05 | 0.1 | — | 0.05 |

TABLE 5-continued

Perfumes of use in the compositions of examples 2 and 3.

| | Perfume 1 wt % | Perfume 2 wt % | Perfume 3 wt % | Perfume 4 wt % |
|---|---|---|---|---|
| Phenyl Ethyl Dimethyl Carbinol | — | — | 1.5 | — |
| Other perfume ingredients | to 100% | to 100% | to 100% | to 100% |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid laundry detergent composition comprising a surfactant system, cationic polymer and a non-encapsulated perfume, wherein the surfactant system comprises surfactant at a level of from about 1.0 wt % to about 70 wt % of the composition, wherein the surfactant system comprises anionic surfactant selected from the group consisting of: sulfate surfactant, sulphonate surfactant and mixtures thereof, at a level of from about 1.4% to about 52% by weight of the liquid laundry detergent composition;

wherein the cationic polymer comprises copolymer of diallyldimethylammonium chloride and acrylic acid; and wherein the non-encapsulated perfume comprises hydrophilic perfume ingredients having a log P of less than about 3.0, wherein the hydrophilic perfume ingredients comprise: allyl amyl glycolate, anisic aldehyde, benzyl acetate, ethyl methyl phenyl glycidate, isoamyl butyrate, laevo carvone, methyl salicylate, para cresyl methyl ether, phenyl ethyl dimethyl carbinol, or a mixture thereof.

2. The laundry detergent composition according to 1, wherein the anionic surfactant comprises alkyl sulphate surfactant, wherein the alkyl sulphate surfactant has an average degree of ethoxylation of from about 0.5 to about 8.0.

3. The laundry detergent composition according to claim 1, wherein the anionic surfactant comprises alkyl sulphate surfactant, wherein the alkyl sulphate surfactant has an average degree of ethoxylation of about 0.5 or less, wherein the alkyl sulphate surfactant comprises a branched alkyl sulphate surfactant.

4. The laundry detergent composition according to claim 3, wherein the branched alkyl sulphate surfactant comprises about 20% or more by weight of the alkyl chains of the branched alkyl sulphate surfactant of 2-branched alkyl chains.

5. The laundry detergent composition according to claim 1, wherein the laundry detergent composition comprises a pyrrolidone polymer, wherein the pyrrolidone polymer is present at a level of about 0.01% to about 3.0% by weight of the composition.

6. The laundry detergent composition according to claim 1, wherein the diallyldimethylammonium chloride and co-acrylic acid monomers are present in a mol ratio of about 50:50 to about 90:10.

7. The laundry detergent composition according to claim 1, wherein the cationic polymer has a weight average molecular weight of about 1,000 Da to about 1,250,000 Da.

8. The laundry detergent composition according to claim 1, wherein the composition comprises free perfume at a level of about 0.1% to about 5.0% by weight of the composition.

9. The laundry detergent composition according to claim 1, wherein the hydrophilic perfume ingredients comprise: allyl amyl glycolate, anisic aldehyde, benzyl acetate, isoamyl butyrate, methyl salicylate, para cresyl methyl ether, phenyl ethyl dimethyl carbinol, or a mixture thereof.

10. The laundry detergent composition according to claim 9, wherein the hydrophilic perfume ingredients comprise: allyl amyl glycolate, anisic aldehyde, benzyl acetate, isoamyl butyrate, para cresyl methyl ether, or a mixture thereof.

11. The laundry detergent composition according to claim 1, wherein the composition comprises from about 0.05% to about 5.0% by weight of the composition of perfume capsules.

12. The laundry detergent composition according to claim 1, wherein the composition further comprises cleaning polymers selected from the group consisting of: amphiphilic alkoxylated grease cleaning polymers; clay soil cleaning polymers; soil release polymers; soil suspending polymers, and combinations thereof.

13. The laundry detergent composition according to claim 1, wherein the pH range of the detergent composition is from about 6.0 to about 8.9.

14. A unit dose article comprising the detergent composition according to claim 1, wherein the detergent composition is encapsulated in a water-soluble or dispersible film, and wherein the detergent composition comprises about 20% or less by weight of water.

* * * * *